United States Patent [19]
Shiraishi

[11] Patent Number: 5,909,386
[45] Date of Patent: Jun. 1, 1999

[54] DIGITAL ADDER

[75] Inventor: Mikio Shiraishi, Yokohama, Japan

[73] Assignee: Kabushiki Kaisha Toshiba, Kawasaki, Japan

[21] Appl. No.: 08/768,947

[22] Filed: Dec. 18, 1996

[30] Foreign Application Priority Data

Dec. 20, 1995 [JP] Japan ................................. 7-331986

[51] Int. Cl.[6] ............................................. G06F 7/50
[52] U.S. Cl. ............................ 364/787.01; 364/784.03
[58] Field of Search ....................... 364/784.01–784.05, 364/785, 786.01–786.04, 787.01, 787.04

[56] References Cited

U.S. PATENT DOCUMENTS

| | | | |
|---|---|---|---|
| 4,583,192 | 4/1986 | Cieslak | 364/784.03 |
| 4,601,007 | 7/1986 | Masaru Uya | 364/784.03 |
| 4,689,763 | 8/1987 | Fang | 364/784.03 |
| 4,718,031 | 1/1988 | Nukiyama | 364/757 |
| 4,791,601 | 12/1988 | Tanaka | 364/760.03 |
| 5,047,976 | 9/1991 | Goto et al. | 364/788 |
| 5,206,825 | 4/1993 | Takagi et al. | 364/746.2 |

*Primary Examiner*—Emmanuel L. Moise
*Attorney, Agent, or Firm*—Banner & Witcoff, Ltd.

[57] ABSTRACT

In a multi-bit adder, the circuit for calculating each bit of sum output is composed of switch circuits arranged regularly, input signals of corresponding bits are entered in the individual switch circuits, and a carry input signal $C_i$ is inputted instead of carry signal $C_k$ of each bit, so that the propagation of the carry signal between the bits is eliminated. As a result, the sum output is delivered in a short time after change of carry input signal $C_i$.

11 Claims, 6 Drawing Sheets

DIGITAL ADDER

BACKGROUND OF THE INVENTION

The present invention generally relates to a digital adder. In particular, the present invention relates to an adder of plural bits operated at a high speed and suitable for a microprocessor, a digital signal processor and the like.

Many systems have been conventionally devised with respect to a high speed adding circuit. This is because, as the number of bits of two numbers to be added is increased, it takes time to add these two numbers since a carry signal is propagated from a least significant bit (LSB) to a most significant bit (MSB) in an adder of a carry ripple type constructed by a simple full adder. There are two methods for solving such a problem. One of these methods is a method for increasing an operating speed of the full adder itself. The other method is a method for generating a carry signal of each bit provided to the full adder by another circuit at a high speed. However, since the circuit construction of the full adder is relatively simple, there is a limit in high speed with respect to only an improvement relative to the circuit. A circuit for generating the carry signal of each bit from an input signal is irregularly constructed in many cases, and has a defect of making the circuit construction complicated as the number of bits is increased. In this method, added results of each bit are also obtained by adding the carry signal of each of the bits to the input signal of each of the bits. Accordingly, there is a delay until a sum output is obtained even when the carry signal is generated by a high speed carry signal generating circuit although this delay is slight.

Figure 6:
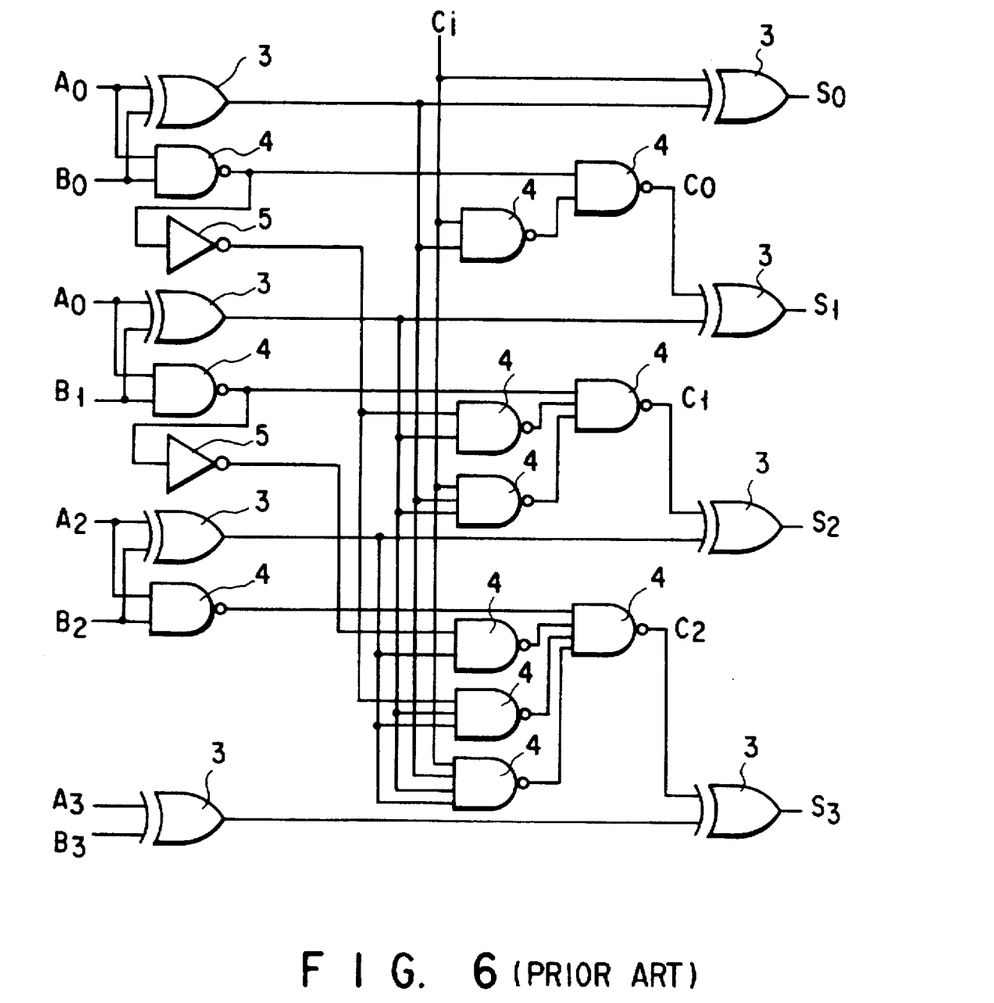
FIG. 6 is a schematic circuit diagram of a four-bit carry look-ahead (CLA) adder as an example of a conventional high speed adder.

FIG. 6 shows a logic circuit of a 4-bit carry look ahead (CLA) adder as one example of the conventional high speed adder.

This adder is constructed by plural Exclusive-OR gates 3 and plural NAND gates 4 and plural inverters 5. This adder uses the above-mentioned second method. Namely, carry signals $C_0$, $C_1$, $C_2$ from zeroth to second bits are respectively generated by using a CLA circuit from input signals $A_0$, $A_1$, $A_2$, $B_0$, $B_1$, $B_2$ and a carry input signal $C_i$ so that an increase in adding time caused by propagation of the carry signals is prevented. These carry signals are finally added to respective sums of bits $A_1$, $A_2$, $A_3$ and bits $B_1$, $B_2$, $B_3$ of the input signals so that sum outputs $S_1$, $S_2$, $S_3$ are obtained. In this adder, a portion of the circuit is communized by the CLA circuit and the adding circuit of each bit. The carry input signal $C_i$ is used to generate a sum $S_0$ of the least significant bit.

The carry signals $C_0$, $C_1$, $C_2$ of the respective bits in the 4-bit CLA adder are represented by the following formula.

$$C_0 = G_0 + P_0 C_i$$

$$C_1 = G_1 + P_1 G_0 + P_1 P_0 C_i$$

$$C_2 = G_2 + P_2 G_1 + P_2 P_1 G_0 + P_2 P_1 P_0 C_i \quad (1)$$

Here, $$P_k = A_k B_k (k=0,1,2,\ldots)$$

$$G_k = A_k \oplus + B_k (k=0,1,2,\ldots) \quad (2)$$

However, there are the following problems in the above-mentioned conventional adder.

Firstly, there is no regularity in the circuit. A structured design method is generally used in the design of a large scale integrated circuit (LSI). This method is a designing method utilizing regularity of the circuit and the layout of a large circuit is easily made by repeatedly arranging the same circuit block in this method. If a certain large circuit can be realized by a repetitious arrangement of the same relatively small circuit block, it is possible to efficiently reduce a time required to carry out a circuit pattern layout work on a semiconductor wafer, and reliability of the design is improved. However, there is no regularity in the circuit construction of the conventional adder so that it is difficult to apply such a method to the conventional adder.

Secondly, a constant delay time is required from generation of the carry signals of the respective bits until added results are outputted. The carry signals generated by the CLA circuit are finally added to respective sums of the respective bits of input signals so that a sum output is obtained. The Exclusive-OR gate 3 is used in this final addition in the example of FIG. 6. Therefore, a propagating delay time of the Exclusive-OR gate is further required after the generation of the carry signals of the respective bits until the sum output is obtained.

BRIEF SUMMARY OF THE INVENTION

The invention is devised in the light of the above circumstance, and it is hence an object thereof to present an adder which can be easily constructed in an integrated circuit by defining a regular arrangement in layout of circuit composition, and which can operate at high speed.

According to the present invention, each circuit for calculating each bit of result of addition is composed of a regular arrangement switch circuit, and a carry input signal $C_i$ is entered in each circuit instead of carry signal $C_k$ of each bit, so that the result of addition S is obtained in a short time after change of the carry input signal $C_i$.

To achieve the object, the invention presents an adder comprising first switch means for receiving a first input signal at a first electrode, and receiving a second input signal at a control electrode, second switch means for receiving an inverted signal of the first input signal at a first electrode, and receiving an inverted signal of the second input signal at a control electrode, third switch means for receiving the first input signal at a first electrode, and receiving an inverted signal of the second input signal at a control electrode, fourth switch means for receiving to an inverted signal of the first input signal at a first electrode, and receiving the second input signal at a control electrode, fifth switch means having a first electrode connected to second electrodes of the first and second switch means, for receiving a third input signal at a control electrode, sixth switch means connected parallel to the fifth switch means, for receiving a fourth input signal at a control electrode, seventh switch means having a first electrode connected to the second electrodes of the first and second switch means, for receiving the third input signal at a control electrode, eighth switch means having a first electrode connected to a second electrode of the seventh switch means, for receiving the fourth input signal at a control electrode, ninth switch means having a first electrode connected to second electrodes of the third and fourth switch means, for receiving an inverted signal of the third input signal at a control electrode, tenth switch means connected parallel to the ninth switch means, for receiving an inverted signal of the fourth input signal at a control electrode, eleventh switch means having a first electrode connected to second electrodes of the third and fourth switches, for receiving an inverted signal of the third input signal at a control electrode, twelfth switch means having a first electrode connected to a second electrode of the eleventh switch means, for receiving an inverted signal of a fourth input signal at a control electrode, thirteenth switch means having a first electrode connected to second electrodes of the fifth and sixth switch means, and a second electrode connected to second electrodes of the eighth and twelfth switch means, for receiving a carry input signal at a control electrode, and fourteenth switch means having a first electrode connected to second electrodes of the ninth and tenth switch means, and a second electrode connected to second electrodes of the eighth and twelfth switch means, for receiving an inverted signal of the carry input signal at a control electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring now to the drawings, embodiments of the invention are described in detail below.

Figure 1:
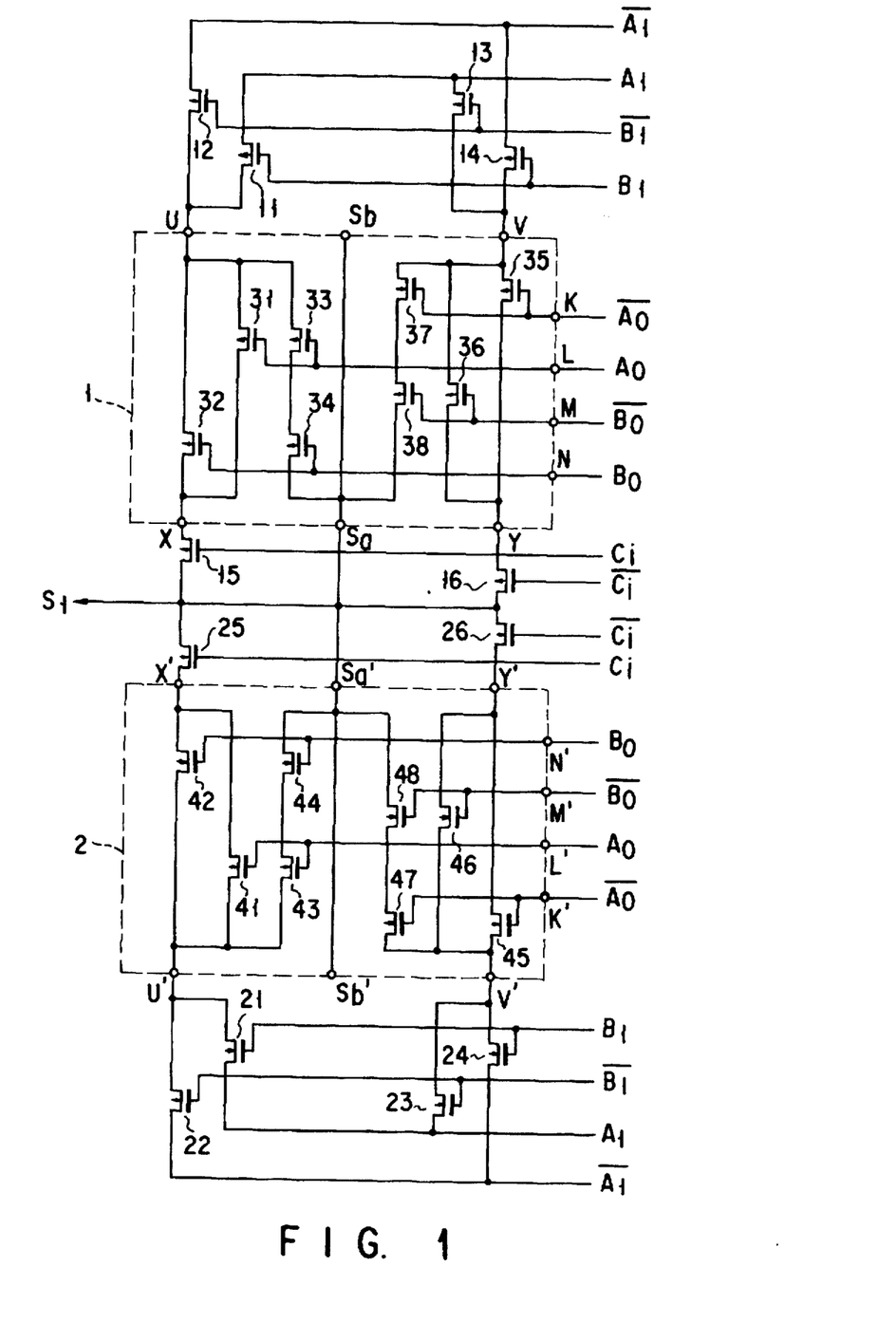
FIG. 1 is a circuit diagram of a multi-bit adder as a first embodiment of the present invention, especially an operation circuit of a first bit.

FIG. 1 shows a multi-bit adder as a first embodiment of the invention, in particular, its operation circuit of first bit.

This operation circuit is composed of switch circuits 1, 2, P channel MOS transistors 11 to 16, and N channel MOS transistors 21 to 26. In the diagram, $A_0$, $B_0$ are zeroth bits of input signal, $/A_0$, $/B_0$ are their inverted signals, $A_1$, $B_1$ are first bits of input signal, and $/A_1$, $/B_1$ are their inverted signals. $C_i$ is a carry input signal, and $S_1$ is a sum output.

The switch circuit 1 is composed of P channel MOS transistors 31 to 38, and the switch circuit 2 is composed of N channel MOS transistors 41 to 48.

An input signal $A_1$ is supplied to the source of a transistor 11 and an input signal $B_1$ is supplied to a gate of the transistor 11. A drain of the transistor 11 is connected to a terminal U. An inverted input signal $/A_1$ is supplied to the source of a transistor 12 and an inverted input signal $/B_1$ is supplied to a gate of the transistor 12. A drain of the transistor 12 is connected to the terminal U. The input signal $A_1$ is supplied to the source of a transistor 13 and the inverted input signal $/B_1$ is supplied to a gate of the transistor 13. A drain of the transistor 13 is connected to a terminal V. The inverted input signal $/A_1$ is supplied to the source of a transistor 14 and the input signal $B_1$ is supplied to a gate of the transistor 14. A drain of the transistor 14 is connected to the terminal V.

The source of a transistor 31 is connected to the terminal U and a gate of the transistor 31 is connected to a terminal L. A drain of the transistor 31 is connected to a terminal X. The source of a transistor 32 is connected to the terminal U and a gate of the transistor 32 is connected to a terminal N. A drain of the transistor 32 is connected to the terminal X. The source of a transistor 33 is connected to the terminal U and a gate of the transistor 33 is connected to the terminal L. A drain of the transistor 33 is connected to the source of a transistor 34. The source of the transistor 34 is connected to the drain of the transistor 33 and a gate of the transistor 34 is connected to the terminal N. A drain of the transistor 34 is connected to a terminal $S_a$. The source of a transistor 35 is connected to the terminal V and a gate of the transistor 35 is connected to a terminal K. A drain of the transistor 35 is connected to a terminal Y. The source of a transistor 36 is connected to the terminal V and a gate of the transistor 36 is connected to a terminal M. A drain of the transistor 36 is connected to a terminal Y. The source of a transistor 37 is connected to the terminal V and a gate of the transistor 37 is connected to the terminal K. A drain of the transistor 37 is connected to the source of a transistor 38. The source of the transistor 38 is connected to the drain of the transistor 37 and a gate of the transistor 38 is connected to the terminal M. A drain of the transistor 38 is connected to the terminal $S_a$.

The source of a transistor 15 is connected to the terminal X and a drain of the transistor 15 is connected to the terminal $S_a$. A carry input signal $C_i$ is supplied to a gate of the transistor 15. The source of a transistor 16 is connected to the terminal Y and a drain of the transistor 16 is connected to the terminal $S_a$. An inverted carry input signal $/C_i$ is supplied to a gate of the transistor 16.

The input signal $A_1$ is supplied to the source of a transistor 21 and the input signal $B_1$ is supplied to a gate of the transistor 21. A drain of the transistor 21 is connected to a terminal U'. The inverted input signal $/A_1$ is supplied to the source of a transistor 22 and the inverted input signal $/B_1$ is supplied to a gate of the transistor 22. A drain of the transistor 22 is connected to the terminal U'. The input signal $A_1$ is supplied to the source of a transistor 23 and the inverted input signal $/B_1$ is supplied to a gate of the transistor 23. A drain of the transistor 23 is connected to a terminal V'. The inverted input signal $/A_1$ is supplied to the source of a transistor 24 and the input signal $B_1$ is supplied to a gate of the transistor 24. A drain of the transistor 24 is connected to the terminal V'.

The source of a transistor 41 is connected to the terminal U' and a gate of the transistor 41 is connected to a terminal L'. A drain of the transistor 41 is connected to a terminal X'. The source of a transistor 42 is connected to the terminal U' and a gate of the transistor 42 is connected to a terminal N'. A drain of the transistor 42 is connected to the terminal X'. The source of a transistor 43 is connected to the terminal U' and a gate of the transistor 43 is connected to the terminal L'. A drain of the transistor 43 is connected to the source of a transistor 44. The source of the transistor 44 is connected to the drain of the transistor 43 and a gate of the transistor 44 is connected to the terminal N'. A drain of the transistor 44 is connected to a terminal $S_a$'. The source of a transistor 45 is connected to the terminal V' and a gate of the transistor 45 is connected to a terminal K'. A drain of the transistor 45 is connected to a terminal Y'. The source of a transistor 46 is connected to the terminal V' and a gate of the transistor 46 is connected to a terminal M'. A drain of the transistor 46 is connected to the terminal Y'. The source of a transistor 47 is connected to the terminal V' and a gate of the transistor 47 is connected to the terminal K'. A drain of the transistor 47 is connected to the source of a transistor 48. The source of the transistor 48 is connected to the drain of the transistor 47 and a gate of the transistor 48 is connected to the terminal M'. A drain of the transistor 48 is connected to the terminal $S_a$'.

The source of a transistor 25 is connected to the terminal X' and a drain of the transistor 25 is connected to the terminal $S_a$'. The carry input signal $C_i$ is supplied to a gate of the transistor 25. The source of a transistor 26 is connected to the terminal Y' and a drain of the transistor 26 is connected to the terminal $S_a$'. The inverted carry input signal /$C_i$ is supplied to a gate of the transistor 26.

No element is connected between terminals $S_b$ and $S_b$'. The terminals $S_a$ and $S_a$' are connected to each other so that a sum output $S_1$ is outputted from this connection point.

The input signals /$A_0$, $A_0$, /$B_0$, $B_0$ are respectively supplied to the terminals K, L, M, N of a switch circuit 1. In accordance with a combination of these input signals, the signals are selectively transmitted or interrupted between terminals U, $S_b$, V and terminals X, $S_a$, Y. The terminals $S_a$ and $S_b$ are connected to each other in the circuit interior and one of these terminals $S_a$ and $S_b$ can be omitted in a circuit layout.

The input signals /$A_0$, $A_0$, /$B_0$, $B_0$ are respectively supplied to the terminals K', L', M', N' of a switch circuit 2. In accordance with a combination of these input signals, the signals are selectively transmitted or interrupted between terminals U', $S_b$', V' and terminals X', $S_a$', Y'. The terminals $S_a$' and $S_b$' are connected to each other in the circuit interior and one of these terminals $S_a$' and $S_b$' can be omitted in a circuit layout.

The switch circuit 1 has the following function.

In FIG. 1, signals obtained at terminals U, V, X, Y are now represented by u, v, x, y. Since signals obtained at terminals $S_a$ and $S_b$ have the same logic level, these signals are represented by s. In this case, when it is assumed that signals u, v are input signals and signals x, y, s are output signals, a truth table of the switch circuit 1 is provided as shown in Table 1.

In the Table 1, symbol 0 shows a low (L) voltage level and symbol 1 shows a high (H) voltage level and symbol Z shows a high-impedance state. When the signal s shows high impedance, any signal can be supplied to the terminal $S_a$ or $S_b$. When the signals x, y show high impedance, the input terminal U or V and the output terminal X or Y are not electrically connected to each other.

TABLE 1

| Input | | | | Output | | |
|---|---|---|---|---|---|---|
| $A_0$ | $B_0$ | u | v | x | y | s |
| 0 | 0 | 0 | 0 | 0 | Z | 0 |
| 0 | 0 | 0 | 1 | 0 | Z | 0 |
| 0 | 0 | 1 | 0 | 1 | Z | 1 |
| 0 | 0 | 1 | 1 | 1 | Z | 1 |
| 0 | 1 | 0 | 0 | 0 | 0 | Z |
| 0 | 1 | 0 | 1 | 0 | 1 | Z |
| 0 | 1 | 1 | 0 | 1 | 0 | Z |
| 0 | 1 | 1 | 1 | 1 | 1 | Z |
| 1 | 0 | 0 | 0 | 0 | 0 | Z |
| 1 | 0 | 0 | 1 | 0 | 1 | Z |
| 1 | 0 | 1 | 0 | 1 | 0 | Z |
| 1 | 0 | 1 | 1 | 1 | 1 | Z |
| 1 | 1 | 0 | 0 | Z | 0 | 0 |
| 1 | 1 | 0 | 1 | Z | 1 | 1 |
| 1 | 1 | 1 | 0 | Z | 0 | 0 |
| 1 | 1 | 1 | 1 | Z | 1 | 1 |

TABLE 2

| Input | | Output | |
|---|---|---|---|
| $A_1$ | $B_1$ | u | v |
| 0 | 0 | 0 | 1 |
| 0 | 1 | 1 | 0 |
| 1 | 0 | 1 | 0 |
| 1 | 1 | 0 | 1 |

Further, in this adding circuit, values of the signals u, v are determined by input signals $A_1$, $B_1$. If it is assumed that the signals $A_1$, $B_1$ are input signals and the signals u, v are output signals, the truth table of a circuit portion composed of four P-channel MOS transistors 11 to 14 is provided as shown in Table 2.

TABLE 3

| Input | | | | Output | | |
|---|---|---|---|---|---|---|
| $A_0$ | $B_0$ | u' | v' | x' | y' | s' |
| 0 | 0 | 0 | 0 | Z | 0 | 0 |
| 0 | 0 | 0 | 1 | Z | 1 | 1 |
| 0 | 0 | 1 | 0 | Z | 0 | 0 |
| 0 | 0 | 1 | 1 | Z | 1 | 1 |
| 0 | 1 | 0 | 0 | 0 | 0 | Z |
| 0 | 1 | 0 | 1 | 0 | 1 | Z |
| 0 | 1 | 1 | 0 | 1 | 0 | Z |
| 0 | 1 | 1 | 1 | 1 | 1 | Z |
| 1 | 0 | 0 | 0 | 0 | 0 | Z |
| 1 | 0 | 0 | 1 | 0 | 1 | Z |
| 1 | 0 | 1 | 0 | 1 | 0 | Z |
| 1 | 0 | 1 | 1 | 1 | 1 | Z |
| 1 | 1 | 0 | 0 | 0 | Z | 0 |
| 1 | 1 | 0 | 1 | 0 | Z | 0 |
| 1 | 1 | 1 | 0 | 1 | Z | 1 |
| 1 | 1 | 1 | 1 | 1 | Z | 1 |

The switch circuit 2 has the following function.

In FIG. 1, signals obtained at terminals U', V', X', Y' are now represented by u', v', x', y'. Since signals obtained at terminals $S_a$' and $S_b$' have the same logic level, these signals are represented by s'. In this case, when it is assumed that signals u', v' are input signals and signals x', y', s' are output signals, a truth table of the switch circuit 2 is provided as shown in Table 3.

In the Table 3, symbol 0 shows a low (L) voltage level, symbol 1 shows a high (H) voltage level, and symbol Z shows a high-impedance state. When the signal s' shows high impedance, any signal can be supplied to the terminal $S_a'$ or $S_b'$. When the signals x', y' show high impedance, input terminal U' or V' and output terminal X' or Y' are not electrically connected to each other.

TABLE 4

| Input | | Output | |
|---|---|---|---|
| $A_1$ | $B_1$ | u | v |
| 0 | 0 | 1 | 0 |
| 0 | 1 | 0 | 1 |
| 1 | 0 | 0 | 1 |
| 1 | 1 | 1 | 0 |

Further, in this adding circuit, values of the signals u', v' are determined by input signals $A_1$, $B_1$. When it is assumed that the signals $A_1$, $B_1$ are input signals and the signals u', v' are output signals, the truth table of a circuit portion composed of four N-channel MOS transistors 21 to 24 is provided as shown in Table 4.

Each of the Tables 2 and 4 among these truth tables can be easily converted to the form of a logical expression. Namely, the following logical expression is provided.

$$u = A_1 \oplus B_1$$

$$v = A_1 \odot B_1$$

$$u' = /u$$

$$v' = /v \qquad (3)$$

The relation between input signals $A_0$, $B_0$, $A_1$, $B_1$ and output signals x, y, s, x', y', s' is provided as shown in Table 5 when this relation is shown by a truth table by using the above formula (3) and the above Tables 1 and 3.

As shown in FIG. 1, since terminals $S_a$ and $S_a'$ are connected to each other, output signals s and s' in the Table 5 must be in conformity with each other with respect to all combinations of the input signals. Terminals X, Y, X', Y' are connected to both the terminals $S_a$ and $S_a'$ by P-channel MOS transistors 15, 16 and N-channel MOS transistors 25, 26. These connections correspond to a so-called wired OR.

When the wired OR is used, the logical OR between a signal of high impedance (Z) and a signal indicative of value 0 or 1 can be defined as follows.

$$0+Z=1$$

$$1+Z=1$$

$$Z+Z=Z \qquad (4)$$

TABLE 5

| Input | | | | | Output | | | | |
|---|---|---|---|---|---|---|---|---|---|
| $A_0$ | $B_0$ | $A_1$ | $B_1$ | x | y | s | x' | y' | s' |
| 0 | 0 | 0 | 0 | 0 | Z | 0 | Z | 0 | 0 |
| 0 | 0 | 0 | 1 | 1 | Z | 1 | Z | 1 | 1 |
| 0 | 0 | 1 | 0 | 1 | Z | 1 | Z | 1 | 1 |
| 0 | 0 | 1 | 1 | 0 | Z | 0 | Z | 0 | 0 |
| 0 | 1 | 0 | 0 | 0 | 1 | Z | 1 | 0 | Z |
| 0 | 1 | 0 | 1 | 1 | 0 | Z | 0 | 1 | Z |
| 0 | 1 | 1 | 0 | 1 | 0 | Z | 0 | 1 | Z |

TABLE 5-continued

| Input | | | | | Output | | | | |
|---|---|---|---|---|---|---|---|---|---|
| $A_0$ | $B_0$ | $A_1$ | $B_1$ | x | y | s | x' | y' | s' |
| 0 | 1 | 1 | 1 | 0 | 1 | Z | 1 | 0 | Z |
| 1 | 0 | 0 | 0 | 0 | 1 | Z | 1 | 0 | Z |
| 1 | 0 | 0 | 1 | 1 | 0 | Z | 0 | 1 | Z |
| 1 | 0 | 1 | 0 | 1 | 0 | Z | 0 | 1 | Z |
| 1 | 0 | 1 | 1 | 0 | 1 | Z | 1 | 0 | Z |
| 1 | 1 | 0 | 0 | Z | 1 | 1 | 1 | Z | 1 |
| 1 | 1 | 0 | 1 | Z | 0 | 0 | 0 | Z | 0 |
| 1 | 1 | 1 | 0 | Z | 0 | 0 | 0 | Z | 0 |
| 1 | 1 | 1 | 1 | Z | 1 | 1 | 1 | Z | 1 |

In the example of FIG. 1, the carry input signal $C_i$ is supplied to the control gates of transistors 15 and 25 and its inverted signal $/C_i$ is supplied to the control gates of transistors 16, 26. Accordingly, a sum output $S_1$ is represented by the following formula using output signals x, y, s of the switch circuit 1, output signals x', y', s' of the switch circuit 2, and the carry input signal $C_i$.

$$S_1 = (/C_i)(x+y') + C_i(x'+y) + s + s' \qquad (5)$$

With reference to the Table 5, x and y' are in conformity with each other, and x' and y are also in conformity with each other. Further, s and s' are in conformity with each other. Thus, signals indicative of the same value are included every two in the formula (5). This is because the circuit of FIG. 1 uses a CMOS (complementary metal oxide semiconductor) as a circuit technique. In the CMOS technique, a P-channel MOS transistor and an N-channel MOS transistor are used as a pair. The signals x, y, s are signals generated by a circuit composed of P-channel MOS transistors. The signals x', y', s' are signals generated by a circuit composed of N-channel MOS transistors. When a dynamic circuit or a circuit technique except for the CMOS is used, one of these two sets of signals can be omitted.

The relation between the sum output $S_1$, input signals $A_0$, $B_0$, $A_1$, $B_1$ and the carry input signal $C_i$ can be represented in the form of a truth table from the formula (5) and the Table 5.

TABLE 6

| Input | | | | | Output |
|---|---|---|---|---|---|
| $C_i$ | $A_0$ | $B_0$ | $A_1$ | $B_1$ | $S_1$ |
| 0 | 0 | 0 | 0 | 0 | 0 |
| 0 | 0 | 0 | 0 | 1 | 1 |
| 0 | 0 | 0 | 1 | 0 | 1 |
| 0 | 0 | 0 | 1 | 1 | 0 |
| 0 | 0 | 1 | 0 | 0 | 0 |
| 0 | 0 | 1 | 0 | 1 | 1 |
| 0 | 0 | 1 | 1 | 0 | 1 |
| 0 | 0 | 1 | 1 | 1 | 0 |
| 0 | 1 | 0 | 0 | 0 | 0 |
| 0 | 1 | 0 | 0 | 1 | 1 |
| 0 | 1 | 0 | 1 | 0 | 1 |
| 0 | 1 | 0 | 1 | 1 | 0 |
| 0 | 1 | 1 | 0 | 0 | 1 |
| 0 | 1 | 1 | 0 | 1 | 0 |
| 0 | 1 | 1 | 1 | 0 | 0 |
| 0 | 1 | 1 | 1 | 1 | 1 |
| 1 | 0 | 0 | 0 | 0 | 0 |
| 1 | 0 | 0 | 0 | 1 | 1 |
| 1 | 0 | 0 | 1 | 0 | 1 |
| 1 | 0 | 0 | 1 | 1 | 0 |
| 1 | 0 | 1 | 0 | 0 | 1 |

TABLE 6-continued

| Input | | | | | Output |
|---|---|---|---|---|---|
| $C_i$ | $A_0$ | $B_0$ | $A_1$ | $B_1$ | $S_1$ |
| 1 | 0 | 1 | 0 | 1 | 0 |
| 1 | 0 | 1 | 1 | 0 | 0 |
| 1 | 0 | 1 | 1 | 1 | 1 |
| 1 | 1 | 0 | 0 | 0 | 1 |
| 1 | 1 | 0 | 0 | 1 | 0 |
| 1 | 1 | 0 | 1 | 0 | 0 |
| 1 | 1 | 0 | 1 | 1 | 1 |
| 1 | 1 | 1 | 0 | 0 | 1 |
| 1 | 1 | 1 | 0 | 1 | 0 |
| 1 | 1 | 1 | 1 | 0 | 0 |
| 1 | 1 | 1 | 1 | 1 | 1 |

Table 6 is a truth table thus obtained and showing the relation of input signals and output signals in the embodiment of FIG. 1.

Here, when additions of binary numbers of multiple bits are represented as shown in the following formula (6), it is confirmed from the Table 6 that the sum output $S_1$ corresponds to a first bit of an added result S. Symbol + in the formula (6) does not show a logical OR operation, but shows an arithmetical addition.

$$A = (-1)2^n A_n + 2^{n-1} A_{n-1} + \ldots + 2^2 A_2 + 2A_1 + A_0 \quad (6)$$

$$B = (-1)2^n B_n + 2^{n-1} B_{n-1} + \ldots + 2^2 B_2 + 2B_1 + B_0$$

$$S = A + B$$

$$= (-1)2^n S_n + 2^{n-1} S_{n-1} + \ldots + 2^2 S_2 + 2S_1 + S_0$$

Figure 2:
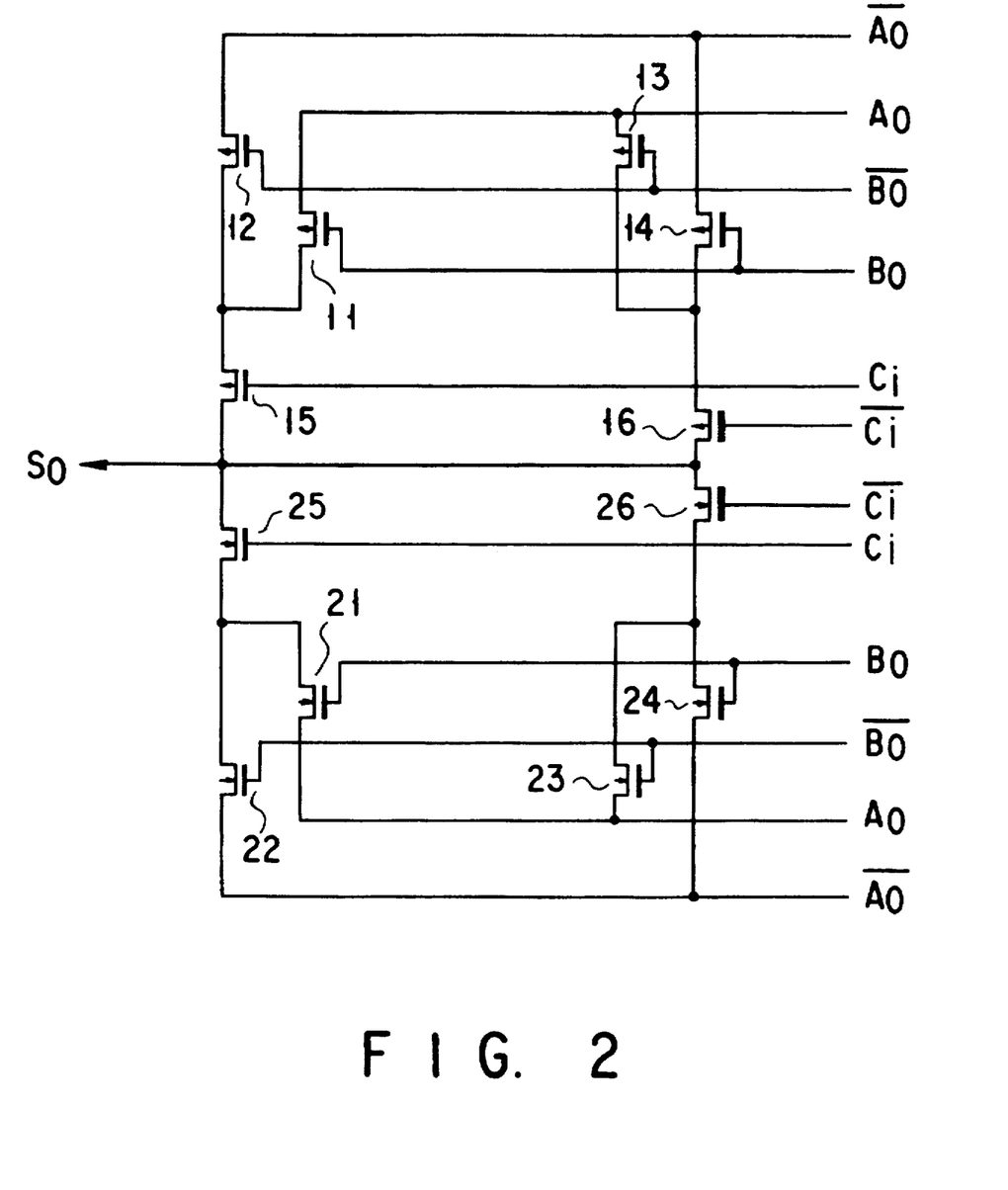
FIG. 2 is a circuit diagram of a multi-bit adder as a second embodiment of the present invention, especially an operation circuit of a zeroth bit, i.e., a least significant bit.

FIG. 2 shows an example in which the circuit construction of the present invention is also applied to an addition of a zeroth bit.

In the circuit of FIG. 2, the switch circuits 1 and 2 are removed from the circuit of FIG. 1 and terminals U, V and terminals X, Y are short-circuited. Further, terminals U', V' and terminals X', Y' are short-circuited and input signals $A_0$, $B_0$ are inputted instead of input signals $A_1$, $B_1$.

This arithmetic circuit is constructed by P-channel MOS transistors 11 to 16 and N-channel MOS transistors 21 to 26. In this figure, reference numerals $A_0$ and $B_0$ designate zeroth bits of input signals, and reference numerals /$A_0$ and /$B_0$ designate their inverted signals. Reference numerals $C_i$ and $S_0$ respectively designate a carry input signal and a sum output.

The input signal $A_0$ is supplied to a source of the transistor 11 and the input signal $B_0$ is supplied to a gate of the transistor 11. A drain of the transistor 11 is connected to a source of the transistor 15. The inverted input signal /$A_0$ is supplied to a source of the transistor 12 and the inverted input signal /$B_0$ is supplied to a gate of the transistor 12. A drain of the transistor 12 is connected to the source of the transistor 15. The input signal $A_0$ is supplied to a source of the transistor 13 and the inverted input signal /$B_0$ is supplied to a gate of the transistor 13. A drain of the transistor 13 is connected to a source of the transistor 16. The inverted input signal /$A_0$ is supplied to a source of the transistor 14 and the input signal $B_0$ is supplied to a gate of the transistor 14. A drain of the transistor 14 is connected to the source of the transistor 16.

The source of the transistor 15 is connected to the drains of the transistors 11 and 12, and a drain of the transistor 15 is connected to an output terminal. The carry input signal $C_i$ is supplied to a gate of the transistor 15. The source of the transistor 16 is connected to the drains of the transistors 13 and 14, and a drain of the transistor 16 is connected to the output terminal. An inverted carry input signal /$C_i$ is supplied to a gate of the transistor 16.

The input signal $A_0$ is supplied to a source of the transistor 21 and the input signal $B_0$ is supplied to a gate of the transistor 21. A drain of the transistor 21 is connected to a source of the transistor 25. The inverted input signal /$A_0$ is supplied to a source of the transistor 22 and the inverted input signal /$B_0$ is supplied to a gate of the transistor 22. A drain of the transistor 22 is connected to the source of the transistor 25. The input signal $A_0$ is supplied to a source of the transistor 23 and the inverted input signal /$B_0$ is supplied to a gate of the transistor 23. A drain of the transistor 23 is connected to a source of the transistor 26. The inverted input signal /$A_0$ is supplied to a source of the transistor 24 and the input signal $B_0$ is supplied to a gate of the transistor 24. A drain of the transistor 24 is connected to the source of the transistor 26.

The source of the transistor 25 is connected to the drains of the transistors 21 and 22 and a drain of the transistor 25 is connected to the output terminal. The carry input signal $C_i$ is supplied to a gate of the transistor 25. The source of the transistor 26 is connected to the drains of the transistors 23 and 24, and a drain of the transistor 26 is connected to the output terminal. The inverted carry input signal /$C_i$ is supplied to a gate of the transistor 26.

This adding circuit has the same function as a sum output circuit of the conventional full adder and this function is represented by the following formula.

$$S_0 = A_0 \oplus B_0 \oplus C_i \quad (7)$$

An arithmetic circuit of zeroth bits (LSB) of the sum output S in the adding formula (6) of multiple bit binary numbers can be realized by the same circuit construction as the full adder generally used in the conventional example shown in FIG. 6 and the present invention. For this reason, the adding circuit of zeroth bits is not limited to the circuit of FIG. 2, but can be constructed by using the conventional full adder. Accordingly, the circuit of FIG. 2 is a sum output circuit of the full adder in a strict meaning, but uses a portion of the circuit of the present invention. Accordingly, the circuit of FIG. 2 is described as a second embodiment in this patent specification.

Figure 3:
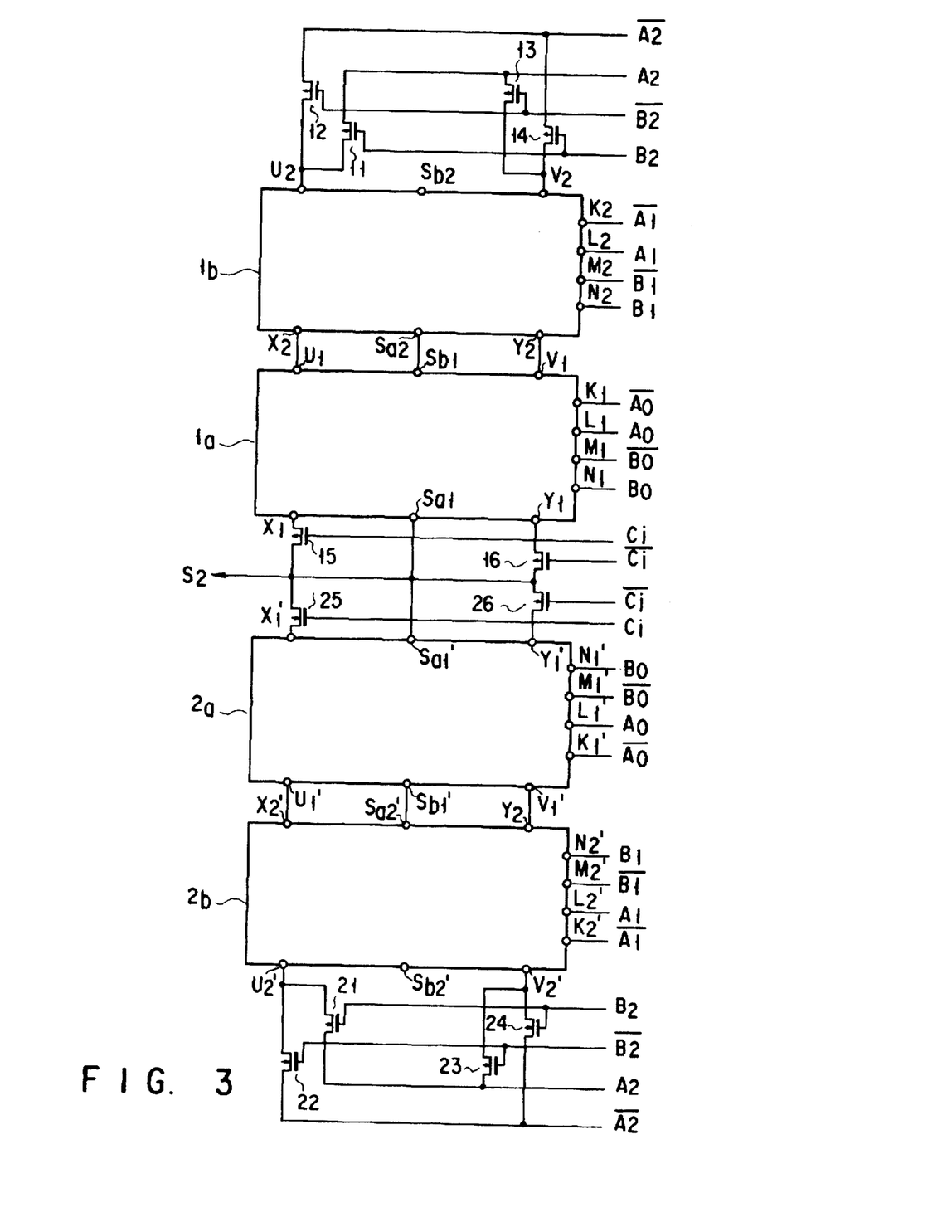
FIG. 3 is a circuit diagram of a multi-bit adder as a third embodiment of the present invention, especially an operation circuit of a second bit.

FIG. 3 shows a multiple bit adder, especially, an arithmetic circuit of second bit thereof as a third embodiment of the present invention.

In the circuit of FIG. 3, two switch circuits 1 are cascaded to each other and two switch circuits 2 are cascaded to each other in the circuit shown in FIG. 1.

This arithmetic circuit is constructed by switch circuits $1_a$, $1_b$, $2_a$, $2_b$, P-channel MOS transistors 11 to 16, and N-channel MOS transistors 21 to 26. In this figure, reference numerals $A_0$ and $B_0$ designate zeroth bits of input signals, and reference numerals /$A_0$ and /$B_0$ designate their inverted signals. Reference numerals $A_1$ and $B_1$ designate first bits of the input signals, and reference numerals /$A_1$ and /$B_1$ designate their inverted signals. Reference numerals $A_2$ and $B_2$ designate second bits of the input signals, and reference numerals /$A_2$ and /$B_2$ designate their inverted signals. Reference numerals $C_i$ and $S_2$ respectively designate a carry input signal and a sum output. Each of the switch circuits $1_a$ and $1_b$ is the same as the switch circuit 1 surrounded by a broken line in FIG. 1 and is constructed by P-channel MOS transistors 31 to 38. Each of the switch circuits $2_a$ and $2_b$ is the same as the switch circuit 2 surrounded by a broken line in FIG. 2 and is constructed by N-channel MOS transistors 41 to 48.

The input signal $A_2$ is supplied to a source of the transistor 11 and the input signal $B_2$ is supplied to a gate of the transistor 11. A drain of the transistor 11 is connected to a terminal $U_2$. The inverted input signal $/A_2$ is supplied to a source of the transistor 12 and the inverted input signal $/B_2$ is supplied to a gate of the transistor 12. A drain of the transistor 12 is connected to the terminal $U_2$. The input signal $A_2$ is supplied to a source of the transistor 13 and the inverted input signal $/B_2$ is supplied to a gate of the transistor 13. A drain of the transistor 13 is connected to a terminal $V_2$. The inverted input signal $/A_2$ is supplied to a source of the transistor 14 and the input signal $B_2$ is supplied to a gate of the transistor 14. A drain of the transistor 14 is connected to the terminal $V_2$.

Input signals $/A_1$, $A_1$, $/B_1$, $B_1$ are respectively supplied to terminals $K_2$, $L_2$, $M_2$, $N_2$ of the switch circuit $1_b$. The drains of the transistors 11 and 12 are connected to the terminal $U_2$, and the drains of the transistors 13 and 14 are connected to the terminal $V_2$. Terminals $X_2$, $S_{a2}$, $Y_2$ are respectively connected to terminals $U_1$, $S_{b1}$, $V_1$ of the switch circuit $1_a$. No element is connected to a terminal $S_{b2}$.

Input signals $/A_0$, $A_0$, $/B_0$, $B_0$ are respectively supplied to terminals $K_1$, $L_1$, $M_1$, $N_1$ of the switch circuit $1_a$. Terminals $U_1$, $S_{b1}$, $V_1$ are respectively connected to terminals $X_2$, $S_{a2}$, $Y_2$ of the switch circuit $1_b$. Terminals $X_1$ and $Y_1$ are respectively connected to sources of the transistors 15 and 16. A terminal $S_{a1}$ is connected to drains of both the transistors 15 and 16.

The source of the transistor 15 is connected to the terminal $X_1$ and the drain of the transistor 15 is connected to a terminal $S_2$. The carry input signal $C_i$ is supplied to a gate of the transistor 15. The source of the transistor 16 is connected to the terminal $Y_1$ and the drain of the transistor 16 is connected to the terminal $S_{a1}$. An inverted carry input signal $/C_i$ is supplied to a gate of the transistor 16.

The input signal $A_2$ is supplied to a source of the transistor 21 and the input signal $B_2$ is supplied to a gate of the transistor 21. A drain of the transistor 21 is connected to a terminal $U_2'$. The inverted input signal $/A_2$ is supplied to a source of the transistor 22 and the inverted input signal $/B_2$ is supplied to a gate of the transistor 22. A drain of the transistor 22 is connected to the terminal $U_2'$. The input signal $A_2$ is supplied to a source of the transistor 23 and the inverted input signal $/B_2$ is supplied to a gate of the transistor 23. A drain of the transistor 23 is connected to a terminal $V_2'$. The inverted input signal $/A_2$ is supplied to a source of the transistor 24 and the input signal $B_2$ is supplied to a gate of the transistor 24. A drain of the transistor 24 is connected to the terminal $V_2'$.

Input signals $/A_1$, $A_1$, $/B_1$, $B_1$ are respectively supplied to terminals $K_2'$, $L_2'$, $M_2'$, $N_2'$ of the switch circuit $2_b$. The drains of the transistors 21 and 22 are connected to the terminal $U_2'$. The drains of the transistors 23 and 24 are connected to the terminal $V_2'$. Terminals $X_2'$, $S_{a2}'$, $Y_2'$ are respectively connected to terminals $U_1'$, $S_{b1}'$, $V_1'$ of the switch circuit $2_a$. No element is connected to a terminal $S_{b2}'$.

Input signals $/A_0$, $A_0$, $/B_0$, $B_0$ are respectively supplied to terminals $K_1'$, $L_1'$, $M_1'$, $N_1'$ of the switch circuit $2_a$. The terminals $U_1'$, $S_{b1}'$, $V_1'$ are respectively connected to the terminals $X_2'$, $S_{a2}'$, $Y_2'$ of the switch circuit $2_b$. Terminals $X_1'$ and $Y_1'$ are respectively connected to sources of the transistors 25 and 26. A terminal $S_{a1}'$ is connected to drains of both the transistors 25 and 26.

The source of the transistor 25 is connected to the terminal $X_1'$ and the drain of the transistor 25 is connected to the terminal $S_{a1}'$. The carry input signal $C_i$ is supplied to a gate of the transistor 25. The source of the transistor 26 is connected to the terminal $Y_1'$ and the drain of the transistor 26 is connected to the terminal $S_{a1}'$. The inverted carry input signal $/C_i$ is supplied to a gate of the transistor 26.

Terminals $S_{a1}$ and $S_{a1}'$ are connected to each other and a sum output $S_2$ is outputted from this connection point.

In FIG. 3, signals obtained at terminals $X_1$, $Y_1$, $X_2$, $Y_2$ are represented by $x_1$, $y_1$, $x_2$, $y_2$ and signals obtained at terminals $X_1'$, $Y_1'$, $X_2'$, $Y_2'$ are represented by $x_1'$, $y_1'$, $x_2'$, $y_2'$. Since signals obtained at terminals $S_{a1}$ and $S_{b1}$ of the switch circuit $1_a$ have the same logic level, these signals are represented by $s_1$. Since signals obtained at terminals $S_{a1}'$ and $S_{b1}'$ of the switch circuit $2_a$ have the same logic level, these signals are represented by $s_1'$.

Since signals obtained at terminals $S_{a2}$ and $S_{b2}$ of the switch circuit $1_b$ have the same logic level, these signals are represented by $s_2$. Since signals obtained at terminals $S_{a2}'$ and $S_{b2}'$ of the switch circuit $2_b$ have the same logic level, these signals are represented by $s_2'$.

In this case, this adding circuit has a function represented by the following formula.

$$S_2=(/Ci)(x_1x_2+y_1'y_2')+C_i(x_1'x_2'+y_1y_2)+s_1+s_2+s_1'+s_2' \quad (8)$$

Signals $x_1$, $y_1$, $x_2$, $y_2$ and signals $x_1'$, $y_1'$, $x_2'$, $y_2'$ can be respectively calculated by using the same tables as the truth tables of the Tables 1 and 3. However, there is a case in which these signals have high impedance values. Namely, a logical AND is also executed in this formula (8) as well as the logical OR between a high impedance signal and a signal indicative of value 0 or 1 defined in the formula (4).

Here, the logical AND between signals capable of providing a value of high impedance (Z) is defined by the following formula.

$$0 \cdot Z = Z$$
$$1 \cdot Z = Z$$
$$Z \cdot Z = Z \quad (9)$$

If the calculation of the formula (8) is executed with reference to the above-mentioned truth tables and the definitions of the logical OR and the logical AND, it is confirmed that this adding circuit generates a second bit of the adding formula (6) of multiple bit data.

Figure 4:
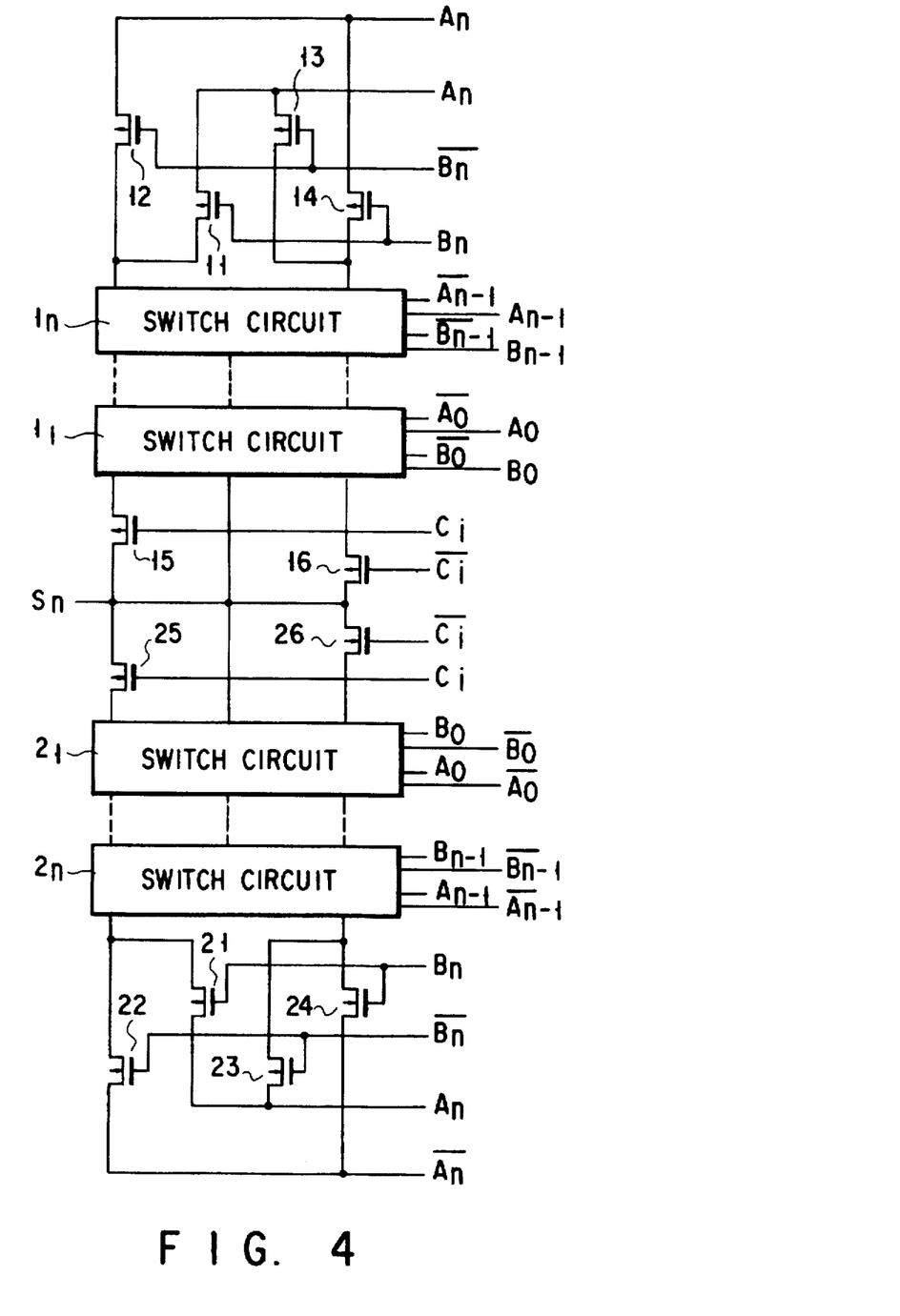
FIG. 4 is a circuit diagram of a multi-bit adder as a fourth embodiment of the present invention, especially an operation circuit of an n-th bit.

FIG. 4 shows a multiple bit adder, especially, an arithmetic circuit of n-th bit thereof as a fourth embodiment of the present invention.

In the circuit of FIG. 4, n-switch circuits 1 are cascaded to each other and n-switch circuits 2 are cascaded to each other in the circuit shown in FIG. 1

This arithmetic circuit is constructed by switch circuits $1_1$ to $1_n$, $2_1$ to $2_n$, P-channel MOS transistors 11 to 16 and N-channel MOS transistors 21 to 26. In this figure, reference numerals $A_0$ and $B_0$ designate zeroth bits of input signals, and reference numerals $/A_0$ and $/B_0$ designate their inverted signals. Reference numerals $A_n$ and $B_n$ designate n-th bits of the input signals, and reference numerals $/A_n$ and $/B_n$ designate their inverted signals. Reference numerals $C_i$ and $S_n$ respectively designate a carry input signal and a sum output. Each of the switch circuits $1_1$ to $1_n$ is the same as the switch circuit 1 surrounded by a broken line in FIG. 1 and is constructed by P-channel MOS transistors 31 to 38. Each of the switch circuits $2_1$ to $2_n$ is the same as the switch circuit 2 surrounded by a broken line in FIG. 1 and is constructed by N-channel MOS transistors 41 to 48.

In FIG. 4, outputs of the switch circuits $1_1$ to $1_n$ are represented by $x_1$ to $x_n$, $y_1$ to $y_n$ and $s_1$ to $s_n$, and outputs of the switch circuits $2_1$ to $2_n$ are represented by $x_1'$ to $x_n'$, $y_1'$ to $y_n'$ and $s_1'$ to $s_n'$.

In this case, this adding circuit has a function represented by the following formula.

$$S_n = (/C_i)(x_1 x_2 ... x_n + y_1' y_2' ... y_n') + \qquad (10)$$

$$C_i(x_1' x_2' ... x_n' + y_1 y_2 ... y_n) +$$

$$s_1 + s_2 + ... + s_n +$$

$$s_1' + s_2' + ... s_n'$$

If the calculation of the formula (10) is executed with reference to the above-mentioned truth tables and the definitions of the logical OR and the logical AND, it is confirmed that this adding circuit generates an n-th bit of the adding formula (6) of multiple bit data.

As can be seen from the above explanation, it is not necessary to generate a carry signal of each bit in the adding circuit of the present invention. One switch circuit 1 and one switch circuit 2 are used in generation of a first bit $S_1$ in a sum. Two switch circuits 1 and two switch circuits 2 are respectively cascaded to each other and are used in generation of a second bit $S_2$. N-switch circuits 1 and n-switch circuits 2 are respectively cascaded to each other and are used in generation of an n-th bit $S_n$. Accordingly, the adding circuit can be regularly constructed.

Figure 5:
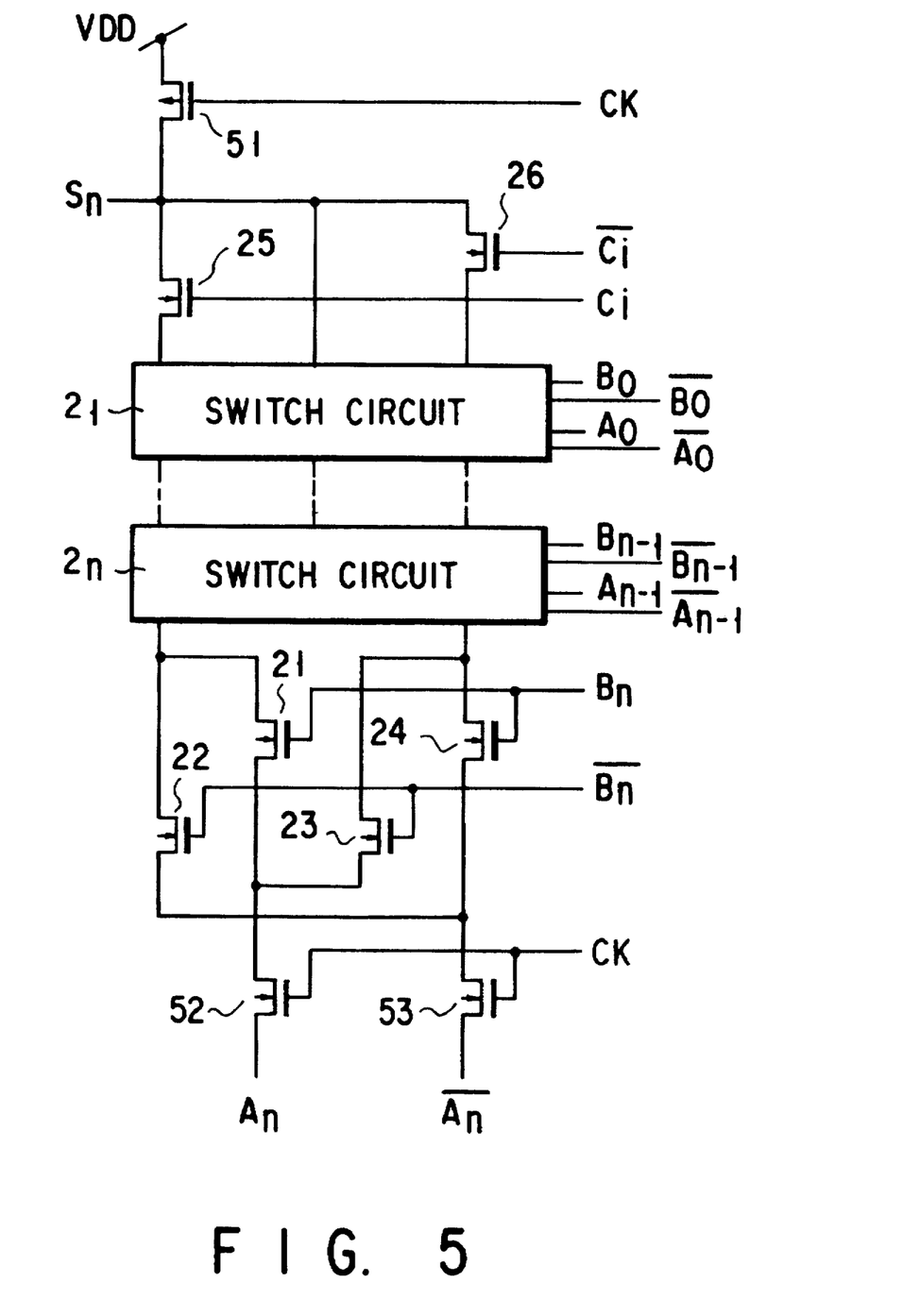
FIG. 5 is a circuit diagram of a dynamic type multi-bit adder as a fifth embodiment of the present invention, especially an operation circuit of an n-th bit.

FIG. 5 shows a multiple bit adder of a dynamic type, especially, an arithmetic circuit of n-th bit thereof as a fifth embodiment of the present invention.

In the circuit of FIG. 5, n-switch circuits 2 are cascaded to each other in the circuit shown in FIG. 1 and a circuit composed of P-channel MOS transistors is removed from the circuit of FIG. 1 and transistors 51, 52 and 53 are further added.

This arithmetic circuit is constructed by switch circuits $2_1$ to $2_n$, a P-channel MOS transistor 51 and N-channel MOS transistors 21 to 26, 52, 53. In this figure, reference numerals $A_0$ and $B_0$ designate zeroth bits of input signals, and reference numerals $/A_0$ and $/B_0$ designate their inverted signals. Reference numerals $A_n$ and $B_n$ designate n-th bits of the input signals, and reference numerals $/A_n$ and $/B_n$ designate their inverted signals. Reference numerals $C_i$ and $S_n$ respectively designate a carry input signal and a sum output. Further, reference numeral CK designates a clock signal for dynamically operating this circuit.

In FIG. 5, when outputs of the switch circuits $2_1$ to $2_n$ are represented by $x_1'$ to $x_n'$, $y_1'$ to $y_n'$ and $s_1'$ to $s_n'$, this adding circuit has a function able to be represented by the following formula.

$$S_n = 1, \qquad CK = 0; \qquad (11)$$

$$S_n = (/C_i)(y_1' y_2' ... y_n') +$$

$$C_i(x_1' x_2' ... x_n') +$$

$$s_1' + s_2' + ... + s_n', \qquad CK = 1$$

If the calculation of the formula (11) is calculated with reference to the above-mentioned truth tables and the definitions of the logical OR and the logical AND, it is confirmed that this adding circuit generates an n-th bit of the adding formula (6) of multiple bit data. If the circuit construction of the dynamic type as in this arithmetic circuit is used, the adding circuit can be constructed by using only one of the switch circuits 1 and 2.

In the first to fifth embodiments shown in FIGS. 1 to 5, when input signals $A_0$ to $A_n$, $B_0$ to $B_n$ and inverted input signals $/A_0$ to $/A_n$, $/B_0$ to $/B_n$ are mutually exchanged and are supplied, inverted sum outputs $/S_0$ to $/S_n$ can be obtained. Thus, in the present invention, the sum and its inverted output can be generated only by exchanging terminals to which input signals are supplied. Accordingly, an inverted buffer and a non-inverted buffer can be used as an output buffer.

As described herein, according to the invention, since the layout of circuit composition is a regular arrangement, an integrated circuit can be constructed easily, the propagation of the carry signal is eliminated, and hence an adder operating at high speed is presented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An adder comprising:

a first switch receiving a first input signal at a first electrode, and receiving a second input signal at a control electrode;

a second switch receiving an inverted signal of said first input signal at a first electrode, and receiving an inverted signal of said second input signal at a control electrode;

a third switch receiving said first input signal at a first electrode, and receiving said inverted signal of said second input signal at a control electrode;

a fourth switch receiving said inverted signal of said first input signal at a first electrode, and receiving said second input signal at a control electrode;

a fifth switch having a first electrode connected to second electrodes of said first and second switches, said fifth switch receiving a third input signal at a control electrode;

a sixth switch connected in parallel to said fifth switch, said sixth switch receiving a fourth input signal at a control electrode;

a seventh switch having a first electrode connected to said second electrodes of said first and second switches, said seventh switch receiving said third input signal at a control electrode;

an eighth switch having a first electrode connected to a second electrode of said seventh switch, said eighth switch receiving said fourth input signal at a control electrode;

a ninth switch having a first electrode connected to second electrodes of said third and fourth switches, said ninth switch receiving an inverted signal of said third input signal at a control electrode;

a tenth switch connected in parallel to said ninth switch, said tenth switch receiving an inverted signal of said fourth input signal at a control electrode;

an eleventh switch having a first electrode connected to said second electrodes of said third and fourth switches, said eleventh switch receiving said inverted signal of said third input signal at a control electrode;

a twelfth switch having a first electrode connected to a second electrode of said eleventh switch, said twelfth switch receiving an inverted signal of said fourth input signal at a control electrode;

a thirteenth switch having a first electrode connected to second electrodes of said fifth and sixth switches, and a second electrode connected to second electrodes of said eighth and twelfth switches, said thirteenth switch receiving a carry input signal at a control electrode; and a fourteenth switch having a first electrode connected to second electrodes of said ninth and tenth switches, and a second electrode connected to said second electrodes of said eighth and twelfth switches, said fourteenth switch receiving an inverted signal of said carry input signal at a control electrode.

2. The adder according to claim 1, wherein said first to fourteenth switches are composed of P channel MOS transistors.

3. The adder according to claim 1, wherein said first to fourteenth switches are composed of N channel MOS transistors.

4. An adder composed of a plurality of switch circuits, each comprising:

a first switch receiving a first input signal at a control electrode;

a second switch connected in parallel to said first switch, said second switch receiving a second input signal at a control electrode;

a third switch having a first electrode connected commonly to first electrodes of said first and second switches, said third switch receiving said first input signal at a control electrode;

a fourth switch having a first electrode connected to a second electrode of said third switch, said fourth switch receiving said second input signal at a control electrode;

a fifth switch receiving an inverted signal of said first input signal at a control electrode;

a sixth switch connected in parallel to said fifth switch, said sixth switch receiving an inverted signal of said second input signal at a control electrode;

a seventh switch having a first electrode connected to first electrodes of said fifth and sixth switches, said seventh switch receiving said inverted signal of said first input signal at a control electrode; and an eighth switch having a first electrode connected to a second electrode of said seventh switch, said eighth switch receiving said inverted signal of said second input signal at a control electrode.

5. The adder according to claim 4, wherein said plurality of switch circuits are connected to each other in a cascade scheme.

6. The adder according to claim 5, wherein said first to eighth switches are composed of P channel MOS transistors.

7. The adder according to claim 5, wherein said first to eighth switches are composed of N channel MOS transistors.

8. The adder according to claim 4, wherein said first to eighth switches are composed of P channel MOS transistors.

9. The adder according to claim 4, wherein said first to eighth switches are composed of N channel MOS transistors.

10. A multi-bit adder having an output terminal comprising:

first through nth switch circuits coupled in cascade, each switch circuit i (i=1, . . . n) supplied with respective corresponding bits $A_{i-1}$, $/A_{i-1}$, $B_{i-1}$, $/B_{i-1}$ and each switch circuit i comprising:

first through sixth nodes, said second node being connected to said fifth node;

a first switch having a first end coupled to said first node, a second end coupled to said fourth node, and a control terminal supplied with the bit $A_{i-1}$;

a second switch coupled in parallel to said first switch, said second switch having a control terminal supplied with the bit $B_{i-1}$;

third and fourth switches coupled in series between said first node and said fifth node, said third switch having a control terminal supplied with the bit $A_{i-1}$ and said fourth switch having a control terminal supplied with the bit $B_{i-1}$;

a fifth switch having a first end coupled to said third node, a second end coupled to said sixth node, and a control terminal supplied with the bit $/A_{i-1}$;

a sixth switch coupled in parallel to said fifth switch, said fifth switch having a control terminal supplied with the bit $/B_{i-1}$; and seventh and eighth switches coupled in series between said third and fifth nodes, said seventh switch having a control terminal supplied with the bit $/A_{i-1}$ and said eighth switch supplied with the bit $/B_{i-1}$;

a ninth switch circuit having a first end supplied with a bit $A_n$, a second end coupled to the first node of the nth switch circuit, and a control terminal supplied with a bit $B_n$;

a tenth switch having a first end supplied with a bit $/A_n$, a second end coupled to the first node of the nth switch circuit, and a control terminal supplied with a bit $/B_n$;

an eleventh switch having a first end supplied with the bit $A_n$, a second end coupled to the third node of the nth switch circuit, and a control terminal supplied with the bit $/B_n$;

a twelfth switch having a first end supplied with the bit $/A_n$, a second end coupled to the third node of the nth switch circuit, and a control terminal supplied with the bit $B_n$;

a thirteenth switch having a first end coupled to the fourth node of the first switch circuit, a second end coupled to said output terminal, and a control terminal supplied with a carry input signal; and a fourteenth switch having a first end coupled to the sixth node of the first switch circuit, a second end coupled to said output terminal, and a control terminal supplied with the complement of the carry input signal, wherein the first nodes of the first through (n−1)th switch circuits are respectively connected to the fourth nodes of the switch circuits next in the cascade, the second nodes of the first through (n−1)th switch circuits are respectively connected to the fifth nodes of the switch circuits next in the cascade, and the third nodes of the of the first through (n−1)th switch circuits are respectively connected to the sixth nodes of the switch circuits next in the cascade.

11. A multi-bit adder having an output terminal comprising:

first through nth switch circuits coupled in cascade, each switch circuit i (i=1, . . . n) supplied with respective corresponding bits $A_{i-1}$, $/A_{i-1}$, $B_{i-1}$, $/B_{i-1}$ and each switch circuit i comprising:

first through sixth nodes, said second node being connected to said fifth node;

a first switch having a first end coupled to said first node, a second end coupled to said fourth node, and a control terminal supplied with the bit $A_{i-1}$;

a second switch coupled in parallel to said first switch, said second switch having a control terminal supplied with the bit $B_{i-1}$;

third and fourth switches coupled in series between said first node and said fifth node, said third switch having a control terminal supplied with the bit $A_{i-1}$ and said fourth switch having a control terminal supplied with the bit $B_{i-1}$;

a fifth switch having a first end coupled to said third node, a second end coupled to said sixth node, and a control terminal supplied with the bit $/A_{i-1}$;

a sixth switch coupled in parallel to said fifth switch, said fifth switch having a control terminal supplied with the bit $/B_{i-1}$; and seventh and eighth switches coupled in series between said third and fifth nodes, said seventh switch having a control terminal supplied with the bit $/A_{i-1}$ and said eighth switch supplied with the bit $/B_{i-1}$;

a ninth switch having a first end coupled to the first node of the first switch circuit, a second end coupled to said output terminal, and a control terminal supplied with a carry input signal;

a tenth switch having a first end coupled to the third node of the first switch circuit, a second end coupled to said output terminal, and a control terminal supplied with the complement of the carry input signal;

an eleventh switch having a first end coupled to said output terminal and a control terminal supplied with a clock signal;

a twelfth switch having a first end coupled to the fourth node of said nth switch circuit and a control terminal supplied with a bit $/B_n$;

a thirteenth switch having a first end coupled to the fourth node of the nth switch circuit and a control terminal supplied with a bit $B_n$;

a fourteenth switch having a first end coupled to the sixth node of the nth switch circuit and a control terminal supplied with the bit $/B_n$;

a fifteenth switch having a first end coupled to the sixth node of the nth switch circuit and a control terminal supplied with the bit $B_n$;

a sixteenth switch having a first end coupled to second ends of said thirteenth and fourteenth switches, a second end supplied with the bit $A_n$, and a control terminal supplied with the clock signal; and a seventeenth switch having a first end coupled to second ends of said twelfth and fifteenth switches, a second end supplied with the bit $/A_n$, and a control terminal supplied with the clock signal, wherein the fourth nodes of the first through (n−1)th switch circuits are respectively connected to the first nodes of the switch circuits next in the cascade, the fifth nodes of the first through (n−1)th switch circuits are respectively connected to the second nodes of the switch circuits next in the cascade, and the sixth nodes of the of the first through (n−1)th switch circuits are respectively connected to the third nodes of the switch circuits next in the cascade.

* * * * *